MICHEL CHOQUET,
MICHEL COEURET &
FRANÇOIS LERAILLEZ,
Inventors
By Stephen H. Frishauf Atty United States Patent Office 3,490,049
Patented Jan. 13, 1970

3,490,049
DEMODULATION OF DIGITAL INFORMATION SIGNALS OF THE TYPE USING ANGLE MODULATION OF A CARRIER WAVE

Michel Choquet, Epinay-sur-Seine, Michel Coeuret, Saint-Brice-sous-Foret, and François Leraillez, Paris, France, assignors to Compagnie Francaise Thomson Houston-Hotchkiss Brandt, Paris, France Filed June 13, 1967, Ser. No. 645,730
Claims priority, application France, June 17, 1966, 65,956
Int. Cl. H03d 3/04
U.S. Cl. 329—126 19 Claims

ABSTRACT OF THE DISCLOSURE

The method of demodulating a signal in which data bits are represented by a differential phase-inversion modulation of a common carrier wave (FIG. 1—line A), comprises sampling the signal amplitude at a sampling rate that is substantially an integral multiple of the modulation rate, e.g. eight times the latter rate, forming the algebraic sum $\alpha_k+\alpha_{k-8}$ of the amplitude samples of corresponding rank in adjacent significant intervals, and storing and totalizing the absolute values of said algebraic sums over a full significant interval to provide a signal representing the quantity $$\sum_{i=k-7}^{k} |\alpha_i+\alpha_{i-8}|$$

This signal varies stepwise between an upper and a lower level as indicated at line C. The instantaneous value of this signal is compared to an average reference value to provide the two-level waveform D which represents the demodulated bits in the incoming information signal. Variations of this method for handling different input signal modulation methods are disclosed.

This invention relates to the demodulation of phase and frequency modulated signals representing digital data. In the remote transmission of numerical data, as for telemetering communications, remote control and similar applications, it is conventional to represent the bits of binary numeration as angle-modulated segments of a carrier wave, the term "angle" as used in this phrase being generic to both frequency and phase, these segments defining the significant intervals of the modulation. For example, 1 bits may be represented as a phase reversal of a carrier frequency at significant instants while 0 bits are represented as no phase-reversal of the said carrier frequency; this is known as differential inversion-phase modulation. As another example, ones may be represented as a significant interval comprising one (or less or more) cycle of a first carrier frequency and zeroes as an equal significant-interval of a different carrier frequency; this is "frequency-shift keying" modulation.

Angle-modulated digital signals of this general character can of course be demodulated through the straightforward use of phase or frequency discriminators. However, these components are relatively contemplated, delicate of adjustment, and unreliable when compared to present-day digital equipment, nor are they capable of being constructed as integrated circuits, as are said later.

More refined techniques of demodulation have accordingly been proposed for signals of the character described, which basically involve sampling the instantaneous amplitudes of the incoming signal at a sampling rate which is an integer multiple of the modulation rate of said signal, memorizing the algebraic signs of the amplitude samples over a number of sampling periods corresponding to at least one full significant interval, and regarding each signal semi-cycle as positive or negative according as the signs of the amplitude samples are predominantly positive or negative. This technique, while considerably more reliable than the straightforward demodulation process first referred to, still has its limitations. It can well happen that a noise burst wipes out a majority, say of minus signs in a negative signal semi-cycle causing it to be interpreted as a positive semi-cycle, whereupon all of the ensuing information may be garbled, as explained above.

Objects of this invention include the provision of improved method and apparatus for demodulating angle-modulated digital data signals, which will be many times simpler, more reliable and efficient that any known to the prior art, whereby incoming signals having reduced signal/noise ratios can be effectively handled. An object is to provide such method and apparatus which is predominantly or wholly digital in character so as to be readily embodied, where desired, in integrated circuitry and by microelectronic techniques.

According to a basic aspect of the invention, the amplitudes of an incoming digital signal wherein successive digits are represented as angle-modulated segments of a carrier wave (at one or more frequencies), are sampled at spaced sampling periods defining a sampling rate which is an approximate integral multiple of the modulation rate in said signal, whereby each sampling period has a determined rank in a digit segment of the carrier wave; amplitude samples of corresponding rank are algebraically added, said samples adding up to a non-zero value or cancelling each other depending on the sequence of the information digits in the signal; the algebraic sum values are stored over a predetermined period comprising a substantial number of said sample periods, and the absolute magnitudes of said algebraic sum values are totalized over said storage period; the totalized amount thus obtained is compared with a fixed reference value, and a signal of one or another digit value is produced depending on the result of the comparison.

It will be understood that inasmuch as the invention utilizes not merely the signs of a sequential series of amplitude samples, but the integrated or totalized values of such samples, in order to derive the output information, the probability of error is considerably reduced and the reliability of the demodulation process is correspondingly increased as compared to the earlier method referred to above. In addition, precise synchronism becomes unessential.

FIG. 2 is a circuit diagram, mostly in block form, of a demodulating system according to the invention for the modulation method just referred to;

Figure 1:
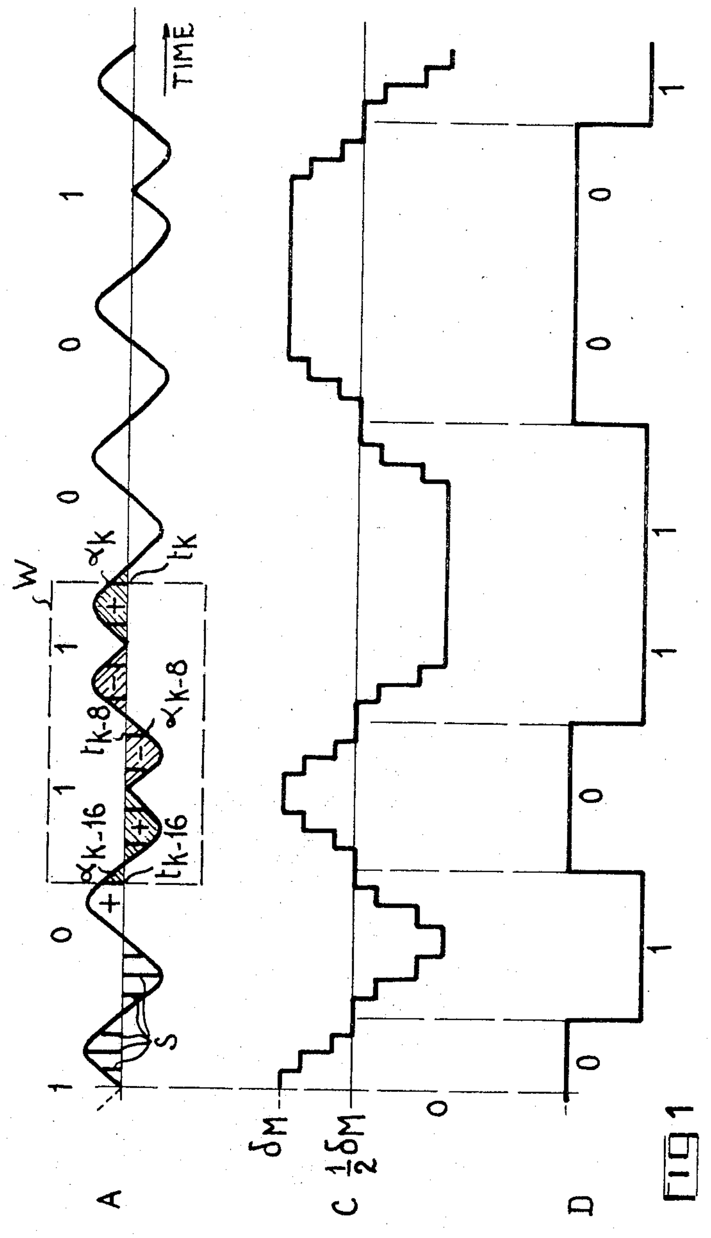
FIG. 1 shows a set of waveforms serving to illustrate the demodulation method of the invention as applied to a wave modulated in the differential inversion phase method, using a full carrier wave cycle per significant interval.

Referring ot FIG. 1, the curves shown in the uppermost line A represents a digitally-coded analog signal modulated in the so-called differential inversion phase method. As here shown, 1-bits are represented by a phase reversal between adjacent full cycles of a carrier wave, and 0-bits are represented by no phase reversal between adjacent cycles of the wave. The graph shows seven consecutive bits forming the binary number 1011001.

Figure 2:
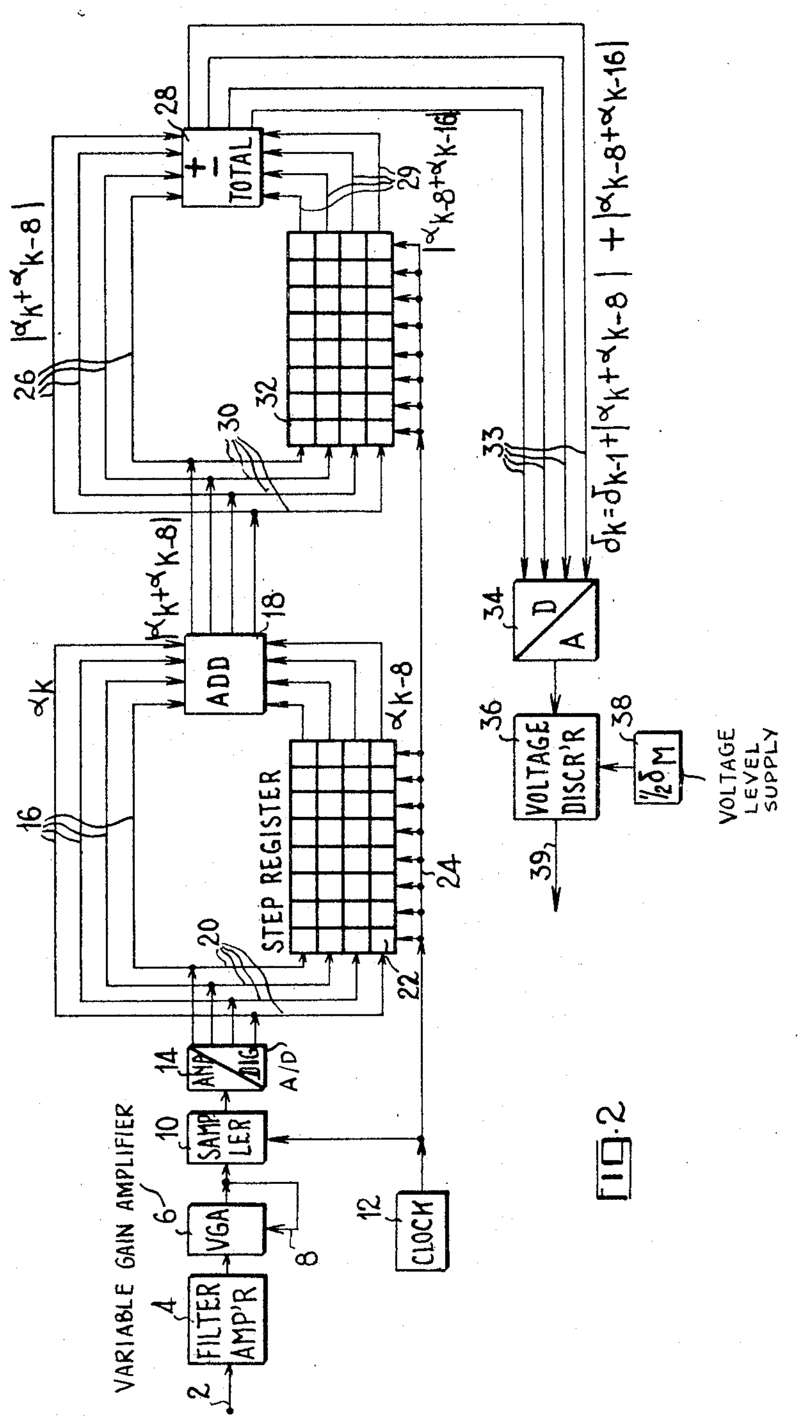

The purpose of the decoding system of the invention, to be described with reference to FIG. 2, is to decode this analog signal and convert it into a conventional binary pulse train, for example of the type indicated in the bottom line D of FIG. 1.

Referring now to FIG. 2, the signal is received at an input terminal 2, which may be the terminal of any transmission link, for instance a telephone link using ordinary voice frequencies. The incoming signal is applied to an input filter amplifier stage 4 and thereafter to a variable-gain amplifier 6 provided with an automatic gain control loop 8, which operates in a conventional manner to suppress spurious amplitude fluctuations in the incoming signal which may be due to variable propagation conditions and other causes. The amplitude-regulated signal is then applied to a sampler unit 10, in which the instantaneous amplitude of the modulated signal is sampled at instants determined by fine isochronal timing pulses applied to the sampler circuit 10 from a stable clock generator 12. The time base frequency of clock generator 12 should be an approximate multiple of the modulation rate, that is, bit repetition rate in the input signal, and is here assumed to be substantially eight times said repetition rate, i.e. 8 times the input carrier frequency in the example. The time base frequency does not necessarily have to have a definite phase relationship with the input signal frequency, nor precise frequency synchronism therewith.

It is important to note in this connection that under ideal conditions, that is, in case of precise frequency synchronism and absence of noise and distortion, the system of the invention would operate correctly even if the rate of the sampling pulses applied to sampler unit 10 were no higher than the modulation rate of the input signal, as will become apparent from the ensuing disclosure. In practical systems however it is much preferred to use a sampling rate substantially higher than the modulation rate, e.g. eight times the latter as in the example disclosed, since this will greatly reduce the adverse effects of desynchronization and input signal noise.

The sampler circuit 10, as will be understood, produces an output in the form of sharp voltage pulses of the form indicated at S in FIG. 1A, having a narrow width and a repetition frequency corresponding to the width and repetition frequency of the clock pulses from generator 12, and having a magnitude corresponding to the instantaneous amplitude of the modulated signal at the time of sampling. These sample pulses are applied to a conventional analog-digital converter 14 (in the drawings, A/D) in which each sample pulse S is converted into a digital code group which is an e.g. binary representation of the voltage magnitude of the sample pulse. In the instant example, the S sample values are represented by four-bit code groups, one bit for the sign and three bits for absolute amplitude value, which therefore can assume eight distinct values, thus rendering the coding substantially independent of precise synchronism.

It will be understood that the analog/digital converter 14 may be constructed to produce output code signals in series or in parallel. In the exemplary embodiment, parallel coding is assumed to be used as indicated by the four output lines from analog/digital converter 14.

The coded output signals from converter 14 are applied over lines 16 to one set of inputs of a digital adder 18, in this case a parallel binary adder. The said coded output signals are also applied over lines 20 to the input of a shift register circuit 22 having a number of stages equal to the number of amplitude samples per signal cycle, i.e. eight stages in this example. With the 4-bit parallel amplitude coding here shown, the shift register circuit 22 would comprise four eight-stage shift registers in parallel, as schematically shown, each stage of each of the four registers being provided in the form of any suitable type of bistable element as is well known. Shift pulses are applied to register circuit 22 over a shift pulse input 24. The shift pulses are applied from the output of clock generator 12 to the corresponding stages of the four parallel registers so as to shift their contents in unison. If the output signals from analog/digital converter 14 are serial rather than parallel codes, then shift register circuit 22 may comprise eight stages each consisting of four serial substages (providing thirty-two stages in all), and the shift pulses applied to the substages would have a repetition rate corresponding to the repetition of the serial code produced by the analog/digital converter 14.

The output from shift register circuit 22, which in this example appears on four parallel output lines as shown, is applied to the second input means of the binary adder 18. The adder operates in the usual way to produce at its output, herein shown as a set of parallel lines, binary coded signals representing the absolute value of the algebraic sum of the pairs of binary numbers simultaneously applied as parallel coded signals to its respective inputs.

Reviewing the operation up to this point, it will be apparent that at any particular sampling instant $t_k$, the binary coded number appearing at the output of adder 18 represents the absolute value of the algebraic sum of the instantaneous signal amplitude, $\alpha_k$, sampled at the same instant, plus the instantaneous signal amplitude, $\alpha_{k-8}$, sampled at the instant $t_{k-8}$ eight clock pulses earlier. This second and earlier signal amplitude as will be understood, is provided at the output of shift register device 22 because the register, in effect, imparts an eight clock period delay to the signals traversing it. Referring to the graph of FIG. 1A, it will be evident that if there has been no phase reversal in the modulated input signal just before the sampling time $t_k$ under consideration, that is, if the data bits transmitted just ahead of the sampling instant considered is zero, then the output quantity $|\alpha_k+\alpha_{k-8}|$ from adder 18 is substantially twice the value of the current sampled amplitude $\alpha_k$ (since $\alpha_{k-8}=\alpha_k$ approx. in this case). If on the other hand there has been a phase reversal in the modulated input signal, i.e. the transmitted data bit just before the sampling time under consideration is 1, as is the case for the sampling instant shown at $t_k$ in the graph, then the output quantity $|\alpha_k+\alpha_{k-8}|$ from adder 18 is substantially zero (since in this case $\alpha_{k-8}=-\alpha_k'$ approx.). It will be understood that these relationships are precisely true in the presence of accurate synchronism and in the absence of noise disturbance. Otherwise the relations are only approximately true, but the approximation is sufficient for correct operation over a wide range of conditions, owing to the many samples stored at any time.

The output from adder 18 is applied over lines 26 to a first input of a so-called digital filter or add-subtract totalizer circuit 28. The adder output is also applied over lines 30 to the input of an eight-position shift register circuit 32 whose output is applied to a second input of the add-subtract totalizer 28. The shift register circuit 32 is similar in construction and operation to the circuit 22 referred to above, and it also receives its shift pulses from clock generator 12, as shown.

The add-subtract totalizer 28, described in greater detail later with reference to FIG. 3, operates to produce at its output a digital quantity representing the algebraic sum of the previous output of said circuit plus the new input amount appearing at its first (upper) input minus the new input amount simultaneously appearing at its second (lower) input, each of said new input amounts being taken with its absolute value. This will be clarified by the following mathematical formulation. As earlier indicated the quantity applied over line 26 to the first or upper input of totalizer 28 at clock period $t_k$ represents $|\alpha_k+\alpha_{k-8}|$; the quantity applied from stepping register 32 to the second or lower input of circuit 28 at the same instant $t_k$, owing to the eight-clock-period delay introduced by said register 32, represents $|\alpha_{k-8}+\alpha_{k-16}|$. Add-subtract totalizer circuit 28 is constructed to produce at the instant $t_k$ an output quantity $\delta_k$ such that $$\delta_k=\delta_{k-1}+|\alpha_k+\alpha_{k-8}|-|\alpha_{k-8}+\alpha_{k-16}| \quad (1)$$

If it is agreed that the output quantity of totalizer circuit 28 has an initial value $\delta_0$ at the start of signal transmission, then it can be immediately verified that the relation (1) can be rewritten as $$\delta_k=\delta_0+\sum_{i=k-7}^{k}|\alpha_i+\alpha_{i-8}| \quad (2)$$

The physical significance of the digital quantities $\delta_k$ generated at successive instants $t_k$ by the circuit 28 may perhaps best be understood as follows. Assume that the areas bounded by the signal curve A are reckoned positively relatively to the horizontal time axis both for the positive and the negative semi-cycles of the curve in the cycles of one phase, and are reckoned negatively both for the positive and negative semi-cycles of opposite phase. This is indicated by the plus and minus signs indicated for some of the significant intervals in FIG. 1A, and is further emphasized by the reversely-directed cross-hatching in the corresponding semi-cycles. Now visualize the rectangle designated W as being a window which is shifted stepwise across the signal curve A in the direction of the time arrow, at a rate corresponding to the clock pulse or sampling rate, the horizontal width of this window being equal as shown to two full signal cycles, that is sixteen clock pulses. Then at an instant $t_k$ corresponding to the leading edge of the window W, the quantity $\delta_k$ generated by digital circuit 28 represents the absolute value of the algebraic sum of the areas bounded by the signal curve A as appearing through the window, that is, the difference between the positive areas (cross-hatched in one direction) and the negative areas (cross-hatched the reverse direction). It may be observed that the function of circuit 28 is equivalent to the limited integration or summation performed by a conventional low-pass filter except that this function is here performed digitally, and it is for this reason that circuit 28 may be termed a digital filter.

The total range of variation of the quantity $\delta_k$ can be seen to be $$\delta_m=\sum_{i=k-7}^{k}|\alpha_i| \quad (3)$$

If the initial number content in the digital filter circuit 28, which represents the initial value $\delta_0$ in Equation 2, is taken equal to $\delta_m$ as given by Equation 3, then the quantity $\delta_k$ will vary between the maximum value $\delta_m$ and a minimum of zero, in the manner indicated by the castellated curve shown in line C of FIG. 1. It is seen that in each significant interval of the input signal, the curve C may present a descending staircase segment, an ascending staircase segment, a low flat segment or a high flat segment. Which particular one of these four types of segment occurs in every signal cycle depends not only on the particular bit, 0 or 1, occurring at the initial transition of the signal cycle considered but also on the bit that occured at the significant instant immediately preceding the initial significant instant of the cycle under consideration.

Returning to FIG. 2, the output from digital filter circuit 28, in the form of a digital signal using a parallel binary code in the present example, is applied over the lines 33 to a conventional digital/analog converter 34. The converter then produces at its single output a stepwise varying voltage waveform corresponding to the curve C just described. This converted output is applied to one input of a voltage discriminator or comparator 36, in which the instantaneous value of said varying input voltage is discriminated against a fixed comparison voltage level applied to the other input of the discriminator as shown at 38, which comparison level is equal to $\frac{1}{2}\delta_M$, that is, the mean ordinate of the curve C. Voltage discriminator 36 produces at its output one constant voltage level, e.g. positive, during those periods when the variable input applied to the discriminator exceeds the fixed comparison level, and produces a different constant output voltage level, e.g. zero, during those other periods when the variable discriminator input voltage is less than said fixed comparison level. Thus the output of voltage discriminator 36 can be represented by the waveform shown at line D of FIG. 1. This represents the desired demodulated output signal, available at terminal 39.

Figure 3:
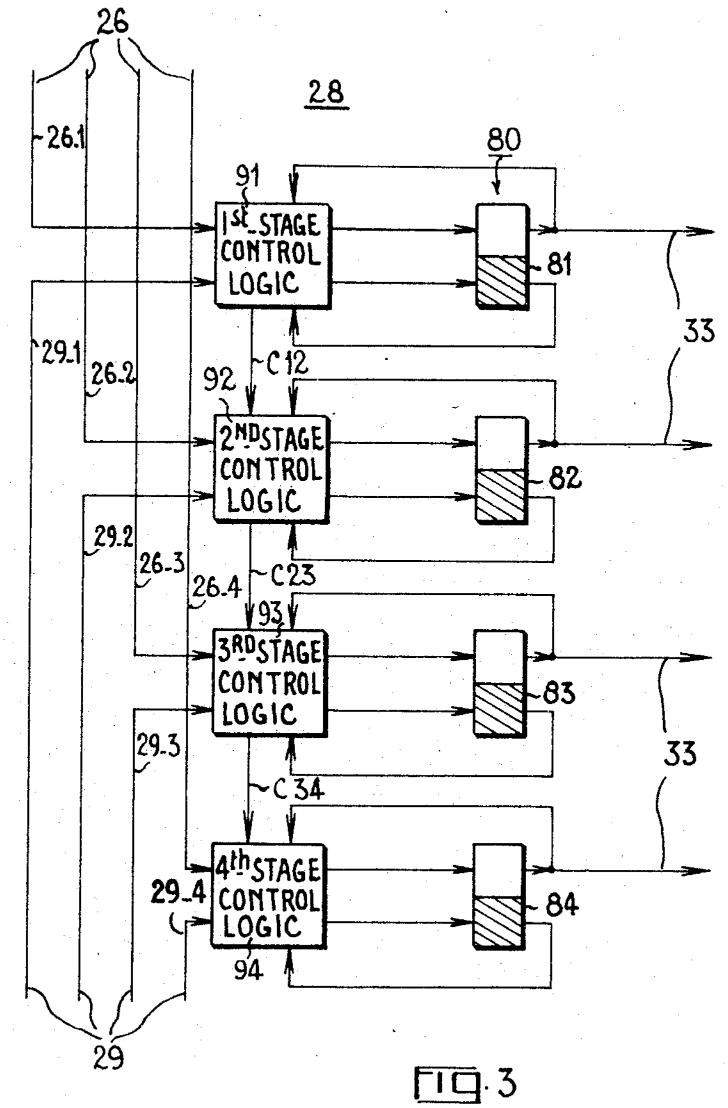
FIG. 3 is a block diagram of an adding-substracting totalizer, or "digital filter" circuit used according to the invention.

An embodiment of the digital filter or adding-subtracting totalizer circuit 28 is schematically illustrated in FIG. 3 as comprising a parallel binary register generally designated 80 and including in this embodiment the four flip-flop circuits 81, 82, 83, 84. Associated with each flip-flop circuit is a logic control circuit 91, 92, 93, 94 respectively. Each logic circuit has an input connected to a respectively related one of the lines 26 leading from the output of adder 18, and an input connected to the related one of the lines 29 leading from the output of shift register 32. Each logic circuit has further inputs connected to the set and reset outputs of the flip-flop circuit of register 80 associated with it, and has a pair of control outputs connected to the setting and resetting inputs of that flip-flop circuit. Further, carry connections $c_{12}$, $c_{23}$ and $c_{34}$ are indicated as leading from each of the logic circuits 91, 92, 93, to the next circuit 92, 93, 94. The logic equations for each of the binary stage control circuits 91, 92, 93, 94 can be readily written by first establishing a table indicating which combinations of the following three quantities, viz, present numeric content of register 80, input quantity $\alpha_k+\alpha_{k-8}$, and input quantity $\alpha_{k-8}+\alpha_{k-16}$, require the number content of the register to increase or remain unchanged.

Figure 4:
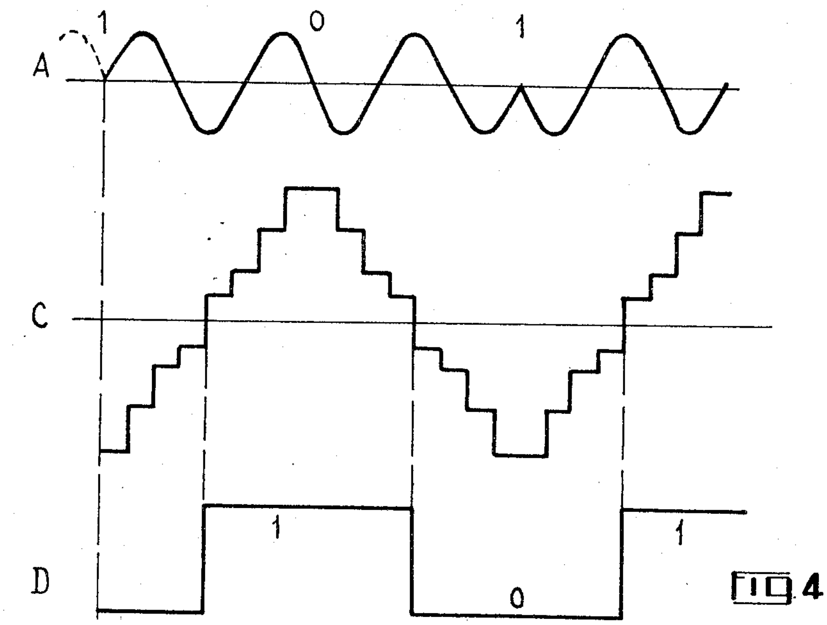
FIG. 4 shows a set of waveforms similar to FIG. 1 relating to a wave modulated in the differential inversion phase method with an odd number (three) of carrier wave semi-cycles per digit cycle.

FIG. 4 shows a variation of the differential phase-inversion modulation method which has been discussed up to this point. In this instance each significant interval of the modulation comprises an odd number, specifically three, of semi-cycles of the carrier frequency, instead of an even number (two) as was shown in FIG. 1. A decoder according to the invention for use with a modulated signal of the type shown in FIG. 4 can be constructed similarly to the decoder of FIG. 2. However, it will be observed that the initial content of digital filter 28, earlier referred to as $\delta_0$, may here be selected equal to zero, the output signal $\delta_k$ therefrom thereafter varying stepwise between zero and the maximum value $\delta_M$.

Figure 5:
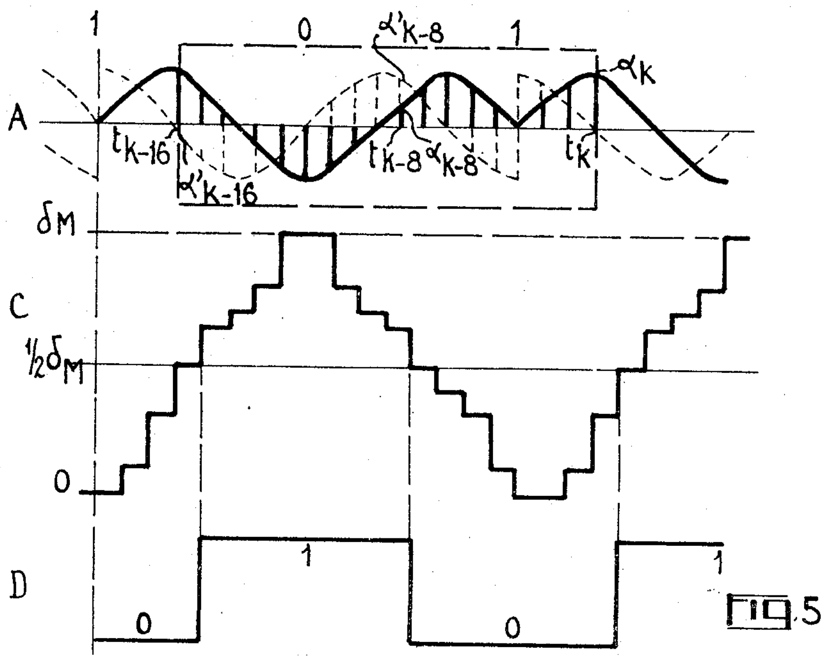
FIG. 5 shows a similar set of waveforms relating to modulation in the differential inversion phase method with an odd number (three) of carrier wave quarter-cycles per digit cycle.
Figure 6:
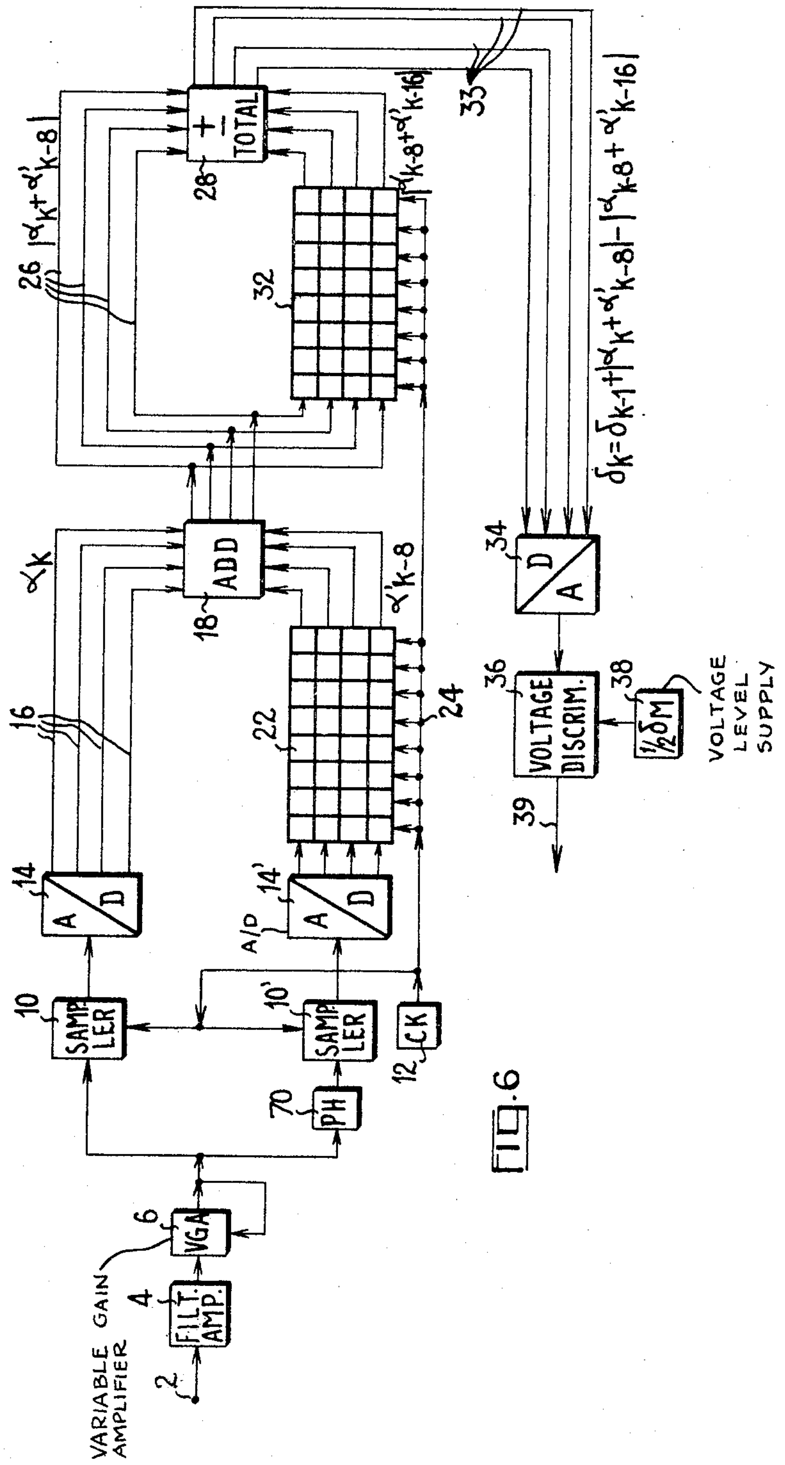
FIG. 6 is a circuit diagram similar to FIG. 2 of an improved demodulator system for use with an input wave of the character shown in FIG. 5.

FIG. 5 shows yet another form of differential inversion-phase modulation method, in which significant interval of the incoming signal comprises an odd number, herein three, of quarter-cycles of the carrier wave, instead of the even number of quarter cycles (four in FIG. 1 and six in FIG. 5) so far considered. For handling this type of modulation code, the decoding circuits may be modified as shown in FIG. 6.

In that figure components corresponding to components in FIG. 2 are similarly numbered, and only the differences between the two circuits will be described. The incoming signal from gain-controlled amplifier 6, in addition to being applied to the sampler 10, is also applied by way of a phase shifter 70 to another similar sampler 10'. The phase shifter 70 imparts to the incoming signal a 90° phase lead, so that the signal applied to the additional sampler 10′ can be represented as the broken-line waveform in line A of FIG. 5. Both samplers 10 and 10′ are fed synchronous sampling pulses from the common clock generator 12. The variable amplitude sample pulses produced by samplers 10 and 10′ are applied to the respective analog/digital converters 14 and 14′. The digital output from converter 14 is applied directly to one side of digital adder 18, while the output from the second converter 14′ is applied to the other side of the adder through an eight-stage stepping register assembly 22. Beyond the adder 18, the system is shown similar to that of FIG. 2.

If we designate the amplitude-sample voltage at instant $t_k$ from sampler 10 by the symbol $\alpha_k$ as in the first embodiment, and the amplitude sample voltage at the same instant from sampler 10′ by $\alpha'_k$, then it will be evident that the digital filter 28 in this embodiment will develop at the sampling instant $t_k$ an output of the form:

$$\delta_k=\delta_{k-1}+|\alpha_k+\alpha'_{k-8}|-|\alpha_{k-8}+\alpha'_{k-16}| \quad (4)$$

Referring to FIG. 5A, there is indicated an arbitrary sampling instant $t_k$, the amplitude-sample voltage $\alpha_k$ representing the instantaneous amplitude of the initial input signal (full-line curve) at that instant as produced in digital form by converter 14, the amplitude-sample voltage $\alpha'_{k-8}$ representing the instantaneous amplitude of the phase-displaced input signal (broken-line curve) at the instant $t_{k-8}$, as produced in digital form from the shift register 22, and the corresponding quantities $\alpha_{k-8}$ and $\alpha'_{k-16}$ whose sum appears at the output from the second shift register 32. From a consideration of FIG. 5, line A, it will be readily seen that for the particular sampling time $t_k$, the quantity $|\alpha_k+\alpha'_{k-8}|$ differs from zero (is positive) whereas the quantity $|\alpha_{k-8}+\alpha'_{k-16}|$ is zero, so that the integrated quantity $\delta_k$ sustains a step increase for that instant. Thus, by applying the "moving-window" concept earlier explained with reference to FIG. 1, a staircase curve of the kind shown in line C of FIG. 5 can be constructed to represent the variations of the quantity $\delta_k$. In constructing this curve, it may be assumed as in the earlier embodiments that the initial content of add-subtract totalizer 28 can in this case be taken equal to zero as shown. The output signal from circuit 28 can then be processed in a manner similar to that described for the first embodiment.

Figure 8:
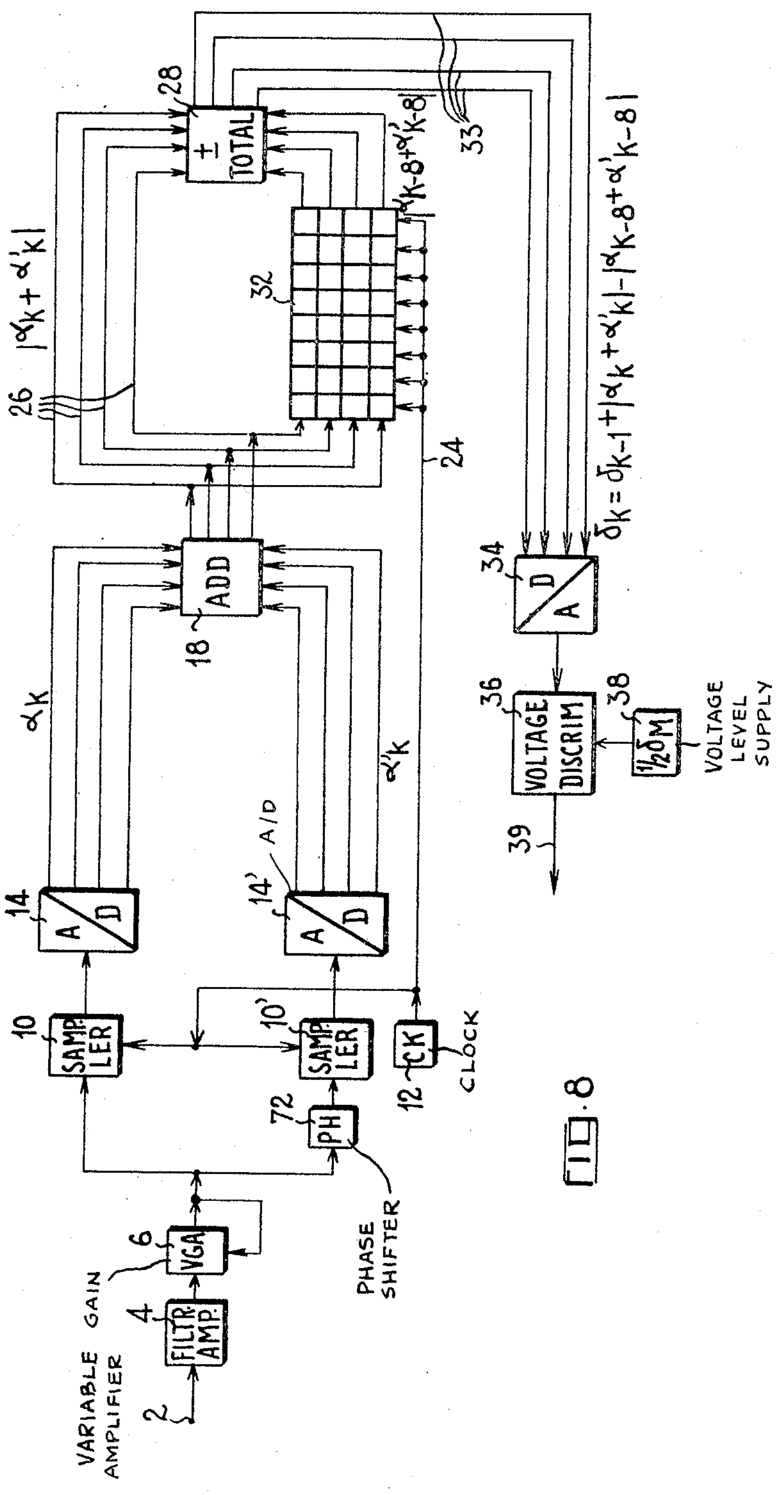
FIG. 8 is a circuit diagram similar to FIGS. 2 and 6 of the demodulator system of the invention adapted for use with an input wave of the type shown in FIG. 7.
Figure 7:
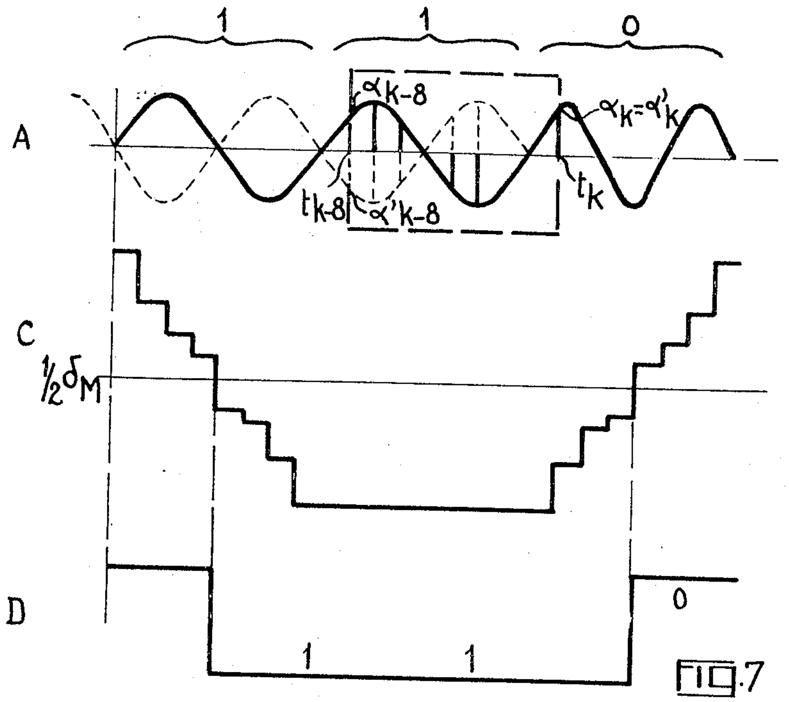
FIG. 7 is a set of waveforms similar to FIGS. 1, 4 and 5, relating to a wave modulated in the frequency-shift keying mode.

In FIG. 7 is illustrated a form of angle modulation of a carrier wave, which utilizes frequency shift keying method. As here shown 1 bits in the input signal are represented by one full cycle of a first carrier frequency $F_1$ and 0 bits are represented by one-and-a-half cycles of a second carrier frequency $$\left(F_2=\frac{3}{2}F_1\right)$$

which is one-and-a-half times higher than the first frequency, so that the significant intervals of the input signal are uniform. This type of signal can be handled by means of a modified demodulator system according to the invention as shown in FIG. 8. Only the differences with respect to the embodiments of FIGS. 2 and 6 will be described.

In FIG. 8, the incoming signal from gain-regulated amplifier 6 is applied to a first sampler circuit 10 and, by way of a phase shifter 72 to a second sampler circuit 10′ in a manner generally similar to what was shown in FIG. 6. The phase shifter 72 in this case serves to impart a phase shift of an odd number of semi-cycles (e.g. one semi-cycle) to one of the two keying frequencies used, in this example to the $F_1$ frequency representing the 1 bits, and impart a phase shift of an even number of semi-cycles (e.g. one full cycle) to the other keying frequency, here the $F_2$ frequency used in keying the 0 bits. Thus, at the output from phase shifter 72 the 1-bit signals assume the form shown by the broken-line sine waves in FIG. 7A, whereas the 0-bit signals retain their original form shown in full lines. The phase shifter 72 used for this purpose may be of the type sometimes known as an "all-pass network" as disclosed, e.g., in "Design Theory and Data for Electrical Filters," pp. 211 et seq., by Skwirzynski (Van Nostrand, 1965).

The variable-amplitude sample pulses from samplers 10 and 10′ are applied to the respective analog-digital converters 14 and 14′ as in FIG. 6. The digital outputs from the two converters are applied directly to the two sides of digital adder 18. Beyond the adder the system is generally similar to that of FIGS. 2 and 6.

Designating the amplitude-sample voltages from samplers 10 and 10′ as $\alpha_k$ and $\alpha'_k$, then the digital filter 28 in this embodiment will be seen to deliver an output of the form.

$$\delta_k=\delta_{k-1}+|\alpha_k+\alpha'_k|-|\alpha_{k-8}+\alpha'_{k-8}| \quad (5)$$

Referring to FIG. 7A, there is indicated for an arbitrary sampling instant $t_k$, the amplitude-sample voltage $\alpha_k$ representing the instantaneous amplitude of the input signal, which in this case is a zero bit and, consequently is not in effect phase shifted and is therefore indicated by a full-line curve. The quantity $\alpha'$ is, in this instance, equal to $\alpha_k$. Also indicated are the amplitude-sample voltages $\alpha_{k-8}$ and $\alpha'_{k-8}$ the sum of which is provided at the output of shift register 32. It will be apparent that for the particular sampling time $t_k$ considered, the quantity $\alpha_k+\alpha'_k$ differs from zero (is positive), whereas the quantity $\alpha_{k-8}+\alpha'_{k-8}$ is zero, so that the integrated signal $\delta_k$ at this time sustains a step increase. Because of the omission of one of the two shift registers (register 22) provided in each of the first disclosed embodiments, the totalizing or integrating operation performed in digital filter circuit 28, in the embodiment now being described, involves only a single significant interval preceding the sampling instant considered instead of two. In other words, the "moving window" indicated as a broken-line rectangle has a width of only eight clock periods along the time coordinate, instead of sixteen clock periods as in the embodiments first disclosed. This is a simplification made possible by the frequency-selective action of phase shifter 72, which in turn is permitted due to the two different frequencies that are used in the keying method being described.

The staircase curve representing the variations of the output signal $\delta_k$ from digital filter circuit 28 is indicated in line C of FIG. 7, and is seen to start with a high initial value, indicating that the initial content of digital filter 28 should be taken equal to $\delta_M$, as in the case of FIG. 1. The said output signal is processed in the remaining circuitry including digital/analog converter 34 and voltage discriminator 36 in a manner similar to what was described earlier herein.

Figure 9:
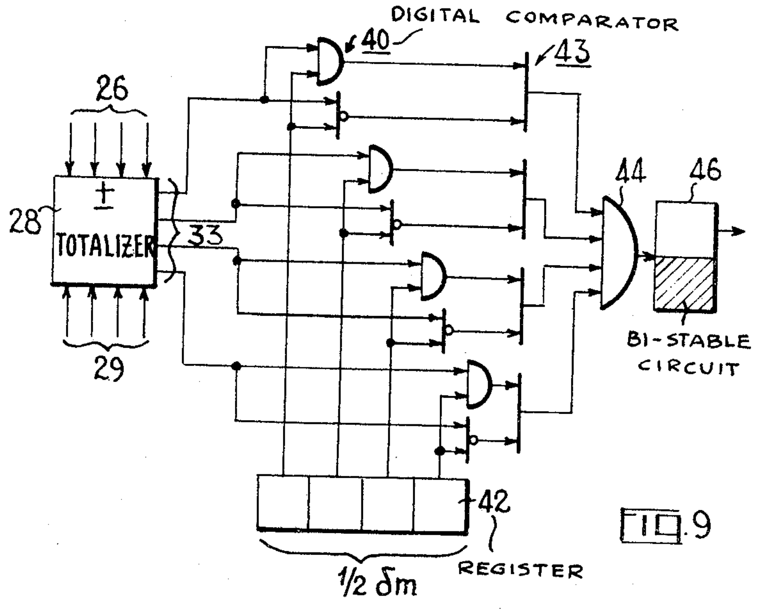
FIG. 9 illustrates a modification of part of any one of the circuits of FIGS. 2, 6 and 8.

FIG. 9 partially illustrates a modification of the invention in which the digital/analog converter 34 and voltage discriminator 36 of the preceding embodiments are omitted. Instead the output lines 33 from add-subtract totalizer 28 are each connected in parallel to the first inputs of respective pairs of AND- and NOR-gates which together constitute a digital comparator 40. The second inputs of the paired comparator gates are connected in parallel to the respective stage outputs of a register 42 in which is preset a binary number representing the reference quantity $\frac{1}{2}\delta_M$ earlier defined. The outputs of each pair of gates 40 are applied by way of OR-gates 43 to a four-input AND-gate 44. It will be understood that if, as would normally be the case, the quantity $\frac{1}{2}\delta_M$ has one less digit positions than the maximum content of totalizer 20, so that register 42 has only three stages, then both comparator gates 40 and OR-gate 43 associated with the uppermost totalizer output line 33 may be omitted, and said line applied direct to AND-gate 44 by way of a NOT-gate. AND-gate 44 will deliver and output whenever the content of totalizer 28 equals the preset reference quantity in register 42. The output from gate 44 is applied to the single input of a bistable circuit 46 of the conventional type which is alternately set and reset to each of its stable states on application of consecutive pulses to its single input. It will be apparent that every time the content of add-subtract totalizer 28 transits through the reference value $\frac{1}{2}\delta_M$ in one sense, say increasing, bistable circuit 46 is switched to one of its states, say the set state, and every time the totalizer content transits through the reference value in the opposite, decreasing, sense, circuit 46 is switched to its other state, say reset. Thus, one output, e.g. the output 39, of circuit 46 will deliver the desired two-state demodulated signal. As will be readily understood, the partial circuitry shown in FIG. 9 may be substituted into any one of the systems shown in FIGS. 2, 6 and 8, in place of the components designated 34, 36 and 38 in those figures thereby to provide an all-digital version of the invention.

The invention has been disclosed with reference to preferred embodiments as applied to four different techniques of angle modulation, specifically three different differential inversion phase modulation methods and one frequency-shift keying modulation method. It will be apparent that these are only illustrative of the various forms of angle-modulated-carrier digital signals that are susceptible of being processed by the demodulation method of the invention.

It will likewise be apparent that although it is preferred to embody the novel demodulation method wholly or predominantly in digital form as disclosed in all of the examplary embodiments, basically such method can just as readily be embodied using analog equipment. Thus, referring to the embodiment of FIG. 2, it would obviously be feasible to omit the analog/digital converter 14 and digital/analog converter 34, replace the digital delay lines or shift registers 22 and 32 by suitable analog delay lines, and replace the digital adder 18 and add-subtract totalizer 28 by corresponding analog circuits. Various other changes may be introduced into the embodiments of the invention shown and described without exceeding the scope of the claims.

Since, as earlier mentioned, the sampling rate under ideal conditions may well be no higher than the modulation rate of the input signal, statements in the claims to the effect that the sampling rate is substantially an integer multiple of the modulation rate, are to be interpreted as including, as a special instance, the case where the sampling rate is substantially equal to the modulation rate.

What we claim is:

1. A method of demodulating a digital data input signal of the type wherein successive bits are coded by means of angle-modulated significant intervals of a carrier wave said intervals defining a modulation rate, comprising:

sampling signal amplitudes at spaced sampling periods sampling rate which is an integer multiple of said modulation rate;

algebraically adding pairs of corresponding amplitude samples in different wave segments each pair adding up to a non-zero value or cancelling depending on the sequence of said data bits;

storing the algebraic sum values and totalizing the absolute magnitudes of the stored sum values over a predetermined period comprising a number of said sample periods;

comparing the totalized amount with a fixed reference value; and producing a signal of one or other digital value depending on the result of the comparison.

2. The method defined in claim 1, wherein there are a plurality of sampling periods per wave segment, and said algebraic adding step comprises, adding amplitude samples of coresponding rank in adjacent intervals.

3. The method defined in claim 1, which includes the steps of digitally coding said amplitude samples, digitally adding the coded amplitude samples, digitally storing the algebraic sum values and digitally totalizing the absolute magnitudes of the stored sum values.

4. The method defined in claim 1, wherein said predetermined period comprises significant interval of said signal wave.

5. The method defined in claim 1, wherein the algebraically added amplitudes samples in each pair are corresponding-rank amplitude samples in adjacent significant intervals of said carrier wave.

6. The method defined in claim 1, comprising the step of phase shifting said input signal, and wherein the algebraically added amplitude samples in each pair are corresponding-rank samples in a significant interval of the original input signal carrier wave and in a segment of the phase-displaced input signal carrier wave respectively.

7. A system for demodulating digital information signals of the type wherein successive bits are coded by means of angle-modulated significant intervals of a carrier wave said intervals defining a modulation rate, comprising:

means (12) generating a train of sampling pulses at a sampling rate which is substantially an integer multiple of said modulation rate; whereby each sampling pulse has a determined rank in a significant interval of said carrier wave;

circuit means (10, 14, 16, 20, 22, FIG. 2; 10, 14, 16, 70, 10′, 14′, 22, FIG. 6; 10, 14, 72, 10′, 14, FIG. 8) including amplitude sampling means connected for receiving said information signal and said sampling pulse train and including two channels connected for delivering respective signal amplitude samples having corresponding rank in their carrier wave segments;

adder means (18) having a pair of inputs connected to said respective channels and an output producing a signal representing the algebraic sum of said respective amplitude samples delivered by the channels;

storage and totalizing means (32, 28) connected to said adder means output for storing and totalizing the absolute magnitudes of said algebraic sum values over a prescribed number of said sample periods and having an output producing a signal representing the totalized amount; and comparator means (36–38, FIGS. 2, 6 and 8; 40–46, FIG. 9) connected to the totalizer means output and producing a digital signal of one or another value according as said totalized amount is greater or less than a reference amount.

8. The system defined in claim 7, wherein said circuit means comprise amplitude sampler means (10, FIG. 2; 10–10′, FIGS. 6 and 8) connected for receiving said information signal and said sampling pulses and having output means delivering variable-magnitude voltage pulses corresponding to the sampled signal amplitudes, analog/digital converter means (14; 14–14′) connected for receiving said variable-magnitude pulses and delivering digitally coded signals corresponding to the magnitudes thereof, and wherein said adder means (18) is a digital adder having digital signal inputs connected to said converter means.

9. The system defined in claim 7, wherein said storage and totalizing means comprises delay line means (32) having an input connected to the adder means (18) output and having an output delivering the adder output signals after a delay corresponding to said prescribed number of sample periods, and an adding-subtracting totalizer circuit (28) having one input connected to the ader means output an another input connected to the delay line output, and having an output delivering a signal representing the difference of the absolute magnitudes of the signals applied to its respective inputs.

10. The system defined in claim 9, wherein said adder means (18) is a digital adder, said delay line means (32) comprises a shift register connected to receive shift pulses from said sampling pulse generating means (12), and said adding-subtracting totalizer circuit (28) is a digital circuit.

11. The system defined in claim 7, wherein said circuit means comprises a sampler circuit (10) connected to receive said information signal and said sampling pulses, and a delay line (22) corresponding in effective length to a predetermined number of sampling pulse periods, said sampler circuit having an output connected to one input of said adder means (18) to constitute one of said channels, and said delay line (22) having an input connected to said sampler circuit output and having an output connected to the other input of said adder means to constitute said other channel.

12. The system defined in claim 11, wherein said predetermined number of sampling pulse periods corresponds to the number of sampling pulses per significant interval of the information signal.

13. The system defined in claim 7, wherein said circuit means comprises two sampler circuits (10, 10') each connected to receive said information signal and said sampling pulses, phase shift means (70, 72) connected in series with at least one (10') of said sampler circuits, and means connected to outputs of the respective sampler circuits and to the respective inputs of the adder means (18) to constitute parts of said respective channels.

14. The system defined in claim 13, wherein said last mentioned means includes a delay line (22) connected to the output of one (10') of said sampler circuits and the respectively related input of the adder means (18) to constitute part of one of said channels.

15. The system defined in claim 7, including phase shift means (70; 72) connected in series in one of said channels.

16. In a signal processing system the combination comprising:

means (e.g. 10, 14, 22) producing two series of digital code groups at a common repetition rate and representing respective signal amplitudes of substantially equal absolute value but changeable relative sign as between the two series;

a digital adder (18) having respective inputs connected for receiving said respective series of code groups and having an output producing digital code groups representing the algebraic sums of corresponding code groups in the respective series;

a multistage shift register (32) having a shift pulse input connected to receive shift pulses at said common repetition rate, a signal input connected to said adder output and an output; and a digital circuit (28) including a totalizing counter (80) and having respective inputs (26, 29) connected to said adder output and said shift register output for increasing and decreasing the number content of said counter (80) by quantized amounts representing the numerical difference of the absolute values of the code groups received at said inputs;

said circuit (28) having an output (33) connected to said totalizing counter (80) for delivering a digital signal representing a stepwise varying quantity that increases and decreases according to both the relative sign of said first-mentioned code groups produced at a particular time, and the relative sign of said first-mentioned code groups produced at an earlier time, as determined by the number of stages in said multistage shift register (32).

17. The system defined in claim 16, further including comparator means (36–38; 40–46) having an input connected to the output (33) of said digital circuit (28) for comparing the instantaneous value of said stepwise varying quantity with a reference value.

18. The system defined in claim 17, wherein said comparator means comprises a digital comparator circuit (40) and logic circuitry (44, 46) connected to the comparator output for delivering an output signal of one or another electrical condition according as said stepwise varying quantity is above or below said reference value.

19. The system defined in claim 6, wherein said comparator means comprises a digital comparator circuit (40).

References Cited

UNITED STATES PATENTS

| | | | |
|---|---|---|---|
| 3,190,958 | 6/1965 | Bullwinkel et al. | 178—66 |
| 3,223,925 | 12/1965 | Florac et al. | 178—66 X |
| 3,353,101 | 11/1967 | Kawai et al. | 329—126 X |
| 3,401,339 | 9/1968 | Kluever et al. | 325—320 X |
| 3,430,143 | 2/1969 | Walker et al. | 325—320 X |

ALFRED L. BRODY, Primary Examiner

U.S. Cl. X.R.

178—66; 325—320, 30; 328—37, 140; 340—347